United States Patent [19]

Flesher et al.

[11] Patent Number: 4,702,844

[45] Date of Patent: Oct. 27, 1987

[54] FLOCCULANTS AND THEIR USE

[75] Inventors: Peter Flesher; David Farrar; Malcolm Hawe; John Langley, all of West Yorkshire, England

[73] Assignee: Allied Colloids Limited, Great Britain

[21] Appl. No.: 766,097

[22] Filed: Aug. 15, 1985

[30] Foreign Application Priority Data

Aug. 15, 1984 [GB] United Kingdom ................ 8420693
Aug. 15, 1984 [GB] United Kingdom ................ 8420694
Aug. 15, 1984 [GB] United Kingdom ................ 8420695
Aug. 12, 1985 [GB] United Kingdom ................ 8520218

[51] Int. Cl.$^4$ .............................................. C02F 1/56
[52] U.S. Cl. .................................. 210/733; 162/164.3; 162/168.3; 209/5; 210/734
[58] Field of Search ................... 209/5; 210/725, 727, 210/728, 732, 733–736; 526/240, 287, 292.2, 304, 307.5, 310, 312, 317.1, 318.2, 318.3, 333; 162/164.3, 168.3

[56] References Cited

U.S. PATENT DOCUMENTS

| | | | |
|---|---|---|---|
| 3,194,758 | 7/1965 | Lissant | 210/732 |
| 3,436,378 | 4/1969 | Azorlosa et al. | 526/333 |
| 3,763,277 | 10/1973 | Chu et al. | 210/732 |
| 3,850,898 | 11/1974 | Ide et al. | 210/733 |
| 3,929,739 | 12/1975 | Barabas et al. | 524/922 |
| 4,012,354 | 3/1977 | Paul | 524/602 |
| 4,579,926 | 4/1986 | Maurer et al. | 210/644 |

FOREIGN PATENT DOCUMENTS 7104037  4/1970  Netherlands ......... 210/734

*Primary Examiner*—Peter Hruskoci
*Attorney, Agent, or Firm*—Jenner & Block

[57] ABSTRACT

A suspension may be flocculated using a water soluble substantially linear polymer having a single point intrinsic viscosity above 3 and that is a copolymer of two or more ethylenically unsaturated monomers including at least 0.5% by weight of monomer carrying pendant hydrophobic groups. The cationic polymers are novel. Preferred polymers are those in which the hydrophobic group is introduced as an allyl ether.

9 Claims, No Drawings

FLOCCULANTS AND THEIR USE

It is well known to use water soluble synthetic polymeric materials derived from ethylenically unsaturated monomers such as acrylic acid and/or acrylamide and/or cationic derivatives thereof as dispersants, thickeners and flocculants.

Polymers that are to be used as dispersants are generally of very low molecular weight, for instance 1,000 to 10,000 and typically have IV (intrinsic viscosity measured in 3 M sodium chloride solution at 25° C.) of around 0.05. (Throughout this specification all intrinsic viscosities are, unless the context requires otherwise, single point intrinsic viscosities as measured at 0.05% polymer concentration). They are useful as dispersants of, for instance, inorganic particles in aqueous media.

If the polymer is to be used as an aqueous thickener it will normally have a molecular weight in the range 100,000 to 1 million and IV 0.25 to 1.5, although higher values are sometimes quoted.

Polymers that are to serve as flocculants must have very high molecular weight, generally above 3 million and often above 5 million, for instance 10 to 15 million. The IV of these polymers is generally above 3 and preferably is above 6, for instance up to 12 to 15 or higher.

In recent years there have been proposals to make polymers having improved thickening power, especially when the aqueous medium contains an electrolyte, by incorporating pendant hydrophobic groups. The molecular weights are usually typical of conventional thickeners, about 1 million. Typical disclosures are in EP Nos. 11806 and 13836. Higher molecular weights are mentioned in U.S. Pat. No. 4,463,151 (as brine thickeners) and lower molecular weights (as dispersants) in EP No. 3235.

In the extensive patent literature the polymers of reasonably high molecular weight have all been described as primarily for use as thickeners and in practice have been used solely for this purpose. However some of these patents do have some speculative suggestions as to other possible uses of the polymers. For instance the polyacrylamides described in EP No. 48094 as preferably having a molecular weight of below 200,000 and which include small amounts of hydrophobic groups introduced by a chain transfer mechanism are said to be useful also as pigment dispersants and as flocculants to clarify aqueous solutions of inorganic materials. From conventional considerations a polymer cannot act satisfactorily as both dispersant and flocculant. It is possible that a moderate molecular weight polymer could act as a dispersant but it is highly improbable that a polymer having a molecular weight below 200,000 could act as a commercially successful flocculant or coagulation agent (although of course some poor degree of flocculation might be obtainable). There is no evidence of their use as flocculants in that specification. The identical disclosure of possible uses, including dispersants and flocculants, appears also in the same patentees EP No. 63018 but again there is no evidence that the described polymers do have a useful flocculation property and it is again very improbable that they could have commercially successful flocculant properties. Indeed since most of the copolymers described in that specification are insoluble in water it is highly improbable that they would serve as flocculants since it is accepted that good flocculation generally requires the use of a truly water soluble polymer.

It is recognised throughout the industry that for each particular flocculation process there is an optimum dose of flocculant. If the dosage is below the optimum inferior flocculation occurs. If the dosage is above the optimum the suspension is overdosed, and again inferior flocculation occurs. The range of doses that are optimum are usually relatively small and so it is essential to control the dosage accurately as otherwise inferior flocculation properties will be achieved. This necessitates careful monitoring of the process, especially when the suspension that is to be flocculated is of variable composition.

A particular problem arises with some suspensions, especially those containing variable amounts of iron, and when the suspension is to be dewatered under high shear, for instance on a centrifuge. With many flocculant polymers it is difficult to maintain flocculant dosage at the optimum when using modern high quality polymers, and instead there is a serious tendency for the suspension to be underdosed or overdosed, and both of these lead to inefficient flocculation and dewatering.

It is also increasingly recognised in the water treatment industry that no single flocculant polymer will be effective for a wide variety of processes and that instead it is necessary to have available a large number of specific flocculant polymers. Accordingly it would be desirable to introduce a new class of flocculant polymer, so as to increase widely the choice of flocculant polymers available for any particular process.

We have now surprisingly found that it is possible effectively to flocculate a suspension by using, as flocculant, a water soluble substantially linear polymer having single point intrinsic viscosity (IV) greater than 3 and that it is a copolymer of two or more ethylenically unsaturated monomers and that contains at least 0.5% by weight of the monomers is monomer that carries a pendant hydrophobic group. The polymers may be non ionic but are preferably anionic or cationic.

The invention also includes novel polymers having an amount of hydrophobic groups and IV as defined above and which are cationic. Thus they may be formed from cationic monomer alone or blended with non ionic monomer. The hydrophobic groups may be on cationic or, if present, non ionic monomer. These polymers are particularly valuable for use as flocculants but may be used in any process where high molecular weight, cationic, water soluble polymers are valuable. It is very surprising that the non ionic, anionic or cationic very high molecular weight polymers, which might be expected to be suitable for causing high viscosity, do in fact give good flocculation properties. Generally the flocculation properties are improved compared to the properties of the corresponding polymer of similar molecular weight and monomers but free of the hydrophobic groups. For instance the amount of the novel polymer required to achieve a particular rate of settlement in a china clay flocculation test may be up to half the amount required when using the corresponding polymer free of the hydrophobic groups.

The polymer is substantially linear and thus preferably consists of an unbranched backbone carrying pendant groups including the hydrophobic groups. Small amounts of branching, for instance as occurs spontaneously without deliberate addition of significant amounts of cross-linking agent, can be tolerated but preferably there is no cross-linking.

Preferably all the monomers from which the copolymer is formed are water soluble. If the polymer contains acid groups it is preferred that the polymer is water soluble whilst these groups are in the free acid form. However in some instances it may be satisfactory for the polymer to be water soluble only when some or all of the acid groups are converted to an ammonium or alkali metal salt form. Polymers containing acid groups may be formed from monomers in which the acid groups are in free acid or salt form and the groups may be converted from salt to free acid, or free acid to salt form after polymerisation.

The single point intrinsic viscosity of the polymer must be above 3 and is preferably above 5, most preferably 7 to 12 or above.

The proportion of monomer that carries a pendant hydrophobic group must be at least 0.5% by weight as otherwise it will not contribute to the properties of the polymer t any significant extent. Preferably at least 3%, and often 3 to 10% by weight of the monomers is provided by monomer carrying a pendant hydrophobic group.

The polymers are made by conventional polymerisation methods designed to provide linear polymers of such molecular weights from ethylenically unsaturated monomers. Since the monomers are preferably water soluble or form a water soluble blend the polymers are preferably made by reverse phase polymerisation or by bulk aqueous solution (or gel) polymerisation. Naturally the polymerising system must be free of materials that will prevent the attainment of the desired molecular weight. For instance polymerisation must not be conducted in the presence of significant amounts of isopropanol or other chain transfer agent as such materials may keep the molecular weight to a very low value, for instance IV below 3.0.

One convenient way of designing a process for making polymers according to the invention of the desired high molecular weight is to adapt an existing process that gives the desired molecular weight merely by replacing part of the monomer in that with monomer that provides the pendant hydrophobic groups. For instance a known process for making a copolymer of monomers A and B (typically acrylic acid or dialkylamine acrylate esters and acrylamide) to a particular high IV value can be adapted to provide a copolymer for use in the invention of similar IV value simply by replacing part of one of the monomers with an equivalent amount of monomer that provides the pendant hydrophobic groups, all other conditions remaining unchanged. Thus the polymers of the invention can be made using conventional initiators and conventional polymerisation conditions designed to give the desired high molecular weights.

The polymers may be supplied as dispersions of polymer particles in oil (for instance as made by reverse phase polymerisation, usually using an amphipathic polymeric stabiliser, optionally followed by dehydration and with the optional addition of a oil-in-water emulsifier) or they may be provided in solid form, for instance as a result of comminuting and drying a gel of the polymer in the same way as conventional gel polymers are dried and comminuted.

The polymer is generally formed from (a) 1 to 90% by weight of ethylenically unsaturated monomers containing the pendant hydrophobic groups and (b) 10 to 99% by weight ethylenically unsaturated monomers free of the hydrophobic groups, i.e. from conventional ethylenically unsaturated monomers. Often the amount of conventional monomers is from 50 to 95% by weight and the amount of monomers containing hydrophobic groups from 2 to 50%, the preferred amounts generally being 75 to 95% and 5 to 25% by weight respectively.

The monomers free of hydrophobic groups are generally acrylic monomers. They may include acidic groups such as acrylic acid, methacrylic acid, 2-acrylamindo-2-methyl propane sulphonic acid or other unsaturated sulphonic or carboxylic acids or they may be non-ionic, for instance acrylamide or methacrylamide. Water soluble derivatives of such acids or amides may be used, for instance dialkylaminoalkyl acrylates or methacrylates and dialkylaminoalkyl acrylamides or methacrylamides wherein the substituents are such that the monomer is, preferably, water soluble. For instance the dialkylaminoalkyl groups may be present in the form of soluble quaternary or other salts. Acid groups may be present as the free acid or as sodium or other alkali metal or ammonium salt.

Particularly preferred anionic copolymers are formed of 5 to 50%, preferably 20 to 40%, by weight acrylic acid or other unsaturated acid, or a sodium or other salt thereof, 50 to 90%, preferably 60 to 80%, by weight acrylamide and 2 to 30% by weight of the monomer that provides the pendant hydrophobic groups.

The cationic polymers suitable for use in the invention are novel. The cationic group can be provided by the monomer carrying the hydrophobe. For instance the polymer may be a copolymer of acrylamide or other non ionic, water soluble, monomer with a cationic monomer carrying the hydrophobe, for instance a quaternary ammonium compound wherein a hydrocarbyl group (e.g., stearyl) is attached to a quaternary or tertiary salt nitrogen atom. Other cationic polymers of the invention are formed of a non ionic monomer carying the hydrophobe (preferably an allyl ether), cationic conventional monomer such as dialkylaminoalkyl (meth) acrylate quaternary or free acid salt and, generally, non ionic monomer such as acrylamide, typically in weight amounts of 1–90%, 10–99%, and 0–80%, preferably 5 to 50%, 20 to 70% and 20 to 70% respectively.

The monomer (a) is preferably an ethylenically unsaturated monomer including a group $—B_nA_mR$ where A is propoxy or butoxy, B is ethoxy ($CH_2CH_2O$), n is zero or, preferably a positive integer generally above 5, often above 10 and preferably 20 to 100 and m is generally zero but, if n is a positive number, m can be a smaller positive number. Thus a polyoxyethylene chain may be interrupted by oxypropylene groups. By appropriate choice of the value of n, m, and the group R it is possible to control the solubility of the monomer and the properties of the final polymer.

R is a hydrophobic group containing at least 8 carbon atoms. It can be a polyoxyalkylene chain where the alkylene groups wholly or mainly are propylene or higher but preferably is a hydrocarbyl group.

The hydrocarbyl group generally contains from 8 to 30, preferably 10 to 24 and most preferably 12 to 18 carbon atoms. It may be selected from alkyl, for instance octyl, lauryl or stearyl, alkaryl such as ethyl benzene ($—BC_2H_4Ph$), aryl such as naphthyl, aralkyl such as alkyl phenyl wherein the alkyl group generally contains 6 to 12 carbon atoms, cycloalkyl (including polycyclic alkyl groups), or mixtures of one or more such groups. Preferred hydrocarbyl groups are alkyl and aralkyl groups. Any of these groups may additionally be substituted provided the substituents do not render the pendant group hydrophilic to an extent that the desired improvement in properties due to the hydrophobic group is lost.

The monomer may be a (meth) acrylic or (meth) allylic monomer. The linkage between the ethylenically unsaturated carbon atom of the monomer and the group $-B_nA_mR$ is generally a chain of at least two, and often at least four atoms and often includes one or more amide, amine, ether of ester groups within the chain. The monomer may be di or polyfunctional, e.g., a derivative of itaconic acid, in which event both acid groups may be substituted by $-B_nA_mR$ or one may be unsubstituted or substituted by a different esterifying group, for instance methyl or higher alkyl, e.g., butyl.

Preferred monomers are (meth) allylic ethers and amides or esters of ethylenically unsaturated carboxylic acids preferably acrylamide, acrylic acid, methacrylic acid, maleic acid or itaconic acid. In esters, the group may be bonded direct to the carboxylic group of the ethylenically unsaturated acid or may be bonded to an esterifying group that may include an amino group or one or more ether or ester linkages. For instance the group R may be a quaternising group in, for instance, the amino group of an amino alkyl esterifying group. In amides the group $-B_nA_mR$ may be bonded to a nitrogen atom of the amide or may be bonded to the nitrogen atom of an aminoalkyl group bonded to amide nitrogen, for instance as a quaternising group. Preferably the monomer (a) is a compound formed by reacting allyl chloride or alcohol or an appropriate ethylenically unsaturated acid or nitrile with a surfactant, preferably a hydroxyl terminated surfactant, preferably having HLB above 8.

Preferred monomers (a) are compounds of the formula $$R^1CH=C(R^2)QB_nA_mR$$

where
$R = C_8-C_{30}$ alkyl or aralkyl,
$R^1 = COOR^3$ or $QB_nA_mR$ where $R^2 =H$ and $Q \neq CH_2O$
or $R^1 = H$
$R^2 = H$ or $CH_3$ or
$R^2 = CH_2COOR^3$ and $Q \neq CH_2O$
$R^2 = CH_2QB_nA_mR$ and $Q \neq CH_2O$
$R^3 = H$ or $C_1-C_8$ alkyl
$Q = O$ where $R^1$ and $R^2$ are H or $Q = CH_2O$, COO or CONR$^4$ where $R^4 =H$ or $CH_3$, or COOR$_N$$^5$+(R$^3$)$_2$.R.X$^-$ where $R^5 =C_1-C_8$ alkyl optionally substituted by hydroxyl, e.g.,

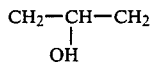

and $X^- =$ anion, e.g., Cl$^-$Br$^-$or CH$_3$SO$_4$$^-$or, when n, m $=O$, Q $=$CONR$^4$ (R$^5$)$_N$+(R$^3$)$_2$ X$^-$where R$^3$, R$^4$, R$^5$, and X. are as above; or COO(R$^5$)OOC or COO(R$^5$)COO where R$^5$ is as above; or COO(R$^5$)OOC(R$^5$)$_N$+(R$^3$)$_2$.X$^-$or COO(R$^5$)COO(R5)$_N$+(R$^3$)$_2$.X$^-$where R, R$^Y$3, R$^5$ and X$^-$are as above. A suitable example of RX that can be used for quaternising is stearyl chloride.

The (meth) allyl ethers are particularly preferred and give polymers having a particularly good combination of performance, rheology, linearity and stability properties during use. It is very surprising that they are so good since all the recent developments in associative polymers including hydrophobic groups have used acrylic monomers and the allyl polymers proposed in GB Nos. 1,167,524 and 1,273,552 appear to have been unsuccessful commercially, possibly because of the form in which they were produced.

The allyl ethers may be made by, for instance, reacting an appropriate surfactant alcohol with sodium or sodium alkoxide to form the sodium derivative and then reacting this with allyl chloride, or by reacting allyl alcohol with the surfactant alcohol with or without a catalyst.

Compounds in which Q includes COOR$^5$COO may be made by reacting, e.g., acrylic acid with a hydroxycarboxylic acid followed by esterification with surfactant alcohol, or by reacting a hydroxyalkyl ester of acrylic acid with the half ester of for example succinic anhydride with a surfactant alcohol. Compounds in which Q includes COOR$^5$OOC may be made by forming a half ester of a dicarboxylic acid and a surfactant alcohol, and reacting this, an unsaturated acid and a diol.

All the other described monomers are described in the quoted patents or can be obtained by routine methods.

When the compound is to have quaternary group including the hydrocarbyl group, the quaternisation can be effected on the appropriate monomer before polymerisation or an unquaternised polymer may be formed, from conventional water soluble monomers, and this may then be quaternised with a quaternising agent, for instance that provides the desired hydrocarbyl group.

In the process of the invention an aqueous solution of the polymer is formed by conventional methods, generally involving an ageing step of at least 30 minutes after blending the polymer with water to permit the polymer to achieve a constant level of hydration. This solution is then combined with the suspension that is to be flocculated. Conventional methods of blending the solution with the suspension may be used.

The amount of polymer that has to be added may be conventional but can be greater by, e.g., 10 to 30%, than the amounts conventionally used with conventional flocculants. Suitable doses are in the range 0.01 to 3% often 0.5 to 3% by weight polymer based on dry solids.

The suspension that is to be flocculated may be a suspension in water of organic or inorganic particles, but is preferably a sewage sludge.

The invention has the advantage that the flocculated suspension is much more tolerant to physical or chemical effects that would have bad consequences on flocculated suspensions that had been flocculated using conventional highly soluble and linear polymers. For instance conventionally it is necessary to select the amount of flocculant very carefully since if too little or too much is added flocculation performance, for instance as demonstrated by floc size, is greatly inferior compared to the floc size at the optimum doze. Generally only a very narrow range of dosages is optimum. In the invention floc size is less dose dependent and higher dosages can be added without risk of worse flocculation performance due to reduced floc size.

If the suspension is of variable metal or other ion content variations in this content can have significant effects on the flocculation performance. For instance the dosage of conventional flocculant may be optimised for a suspension but if the iron content of that suspension varies with time (as will frequently happen with industrial-based effluents) the dosage may no longer be optimum and may be either inadequate to cause floculation or may be an overdose. In the invention however variation in iron or other ionic content of the suspension has much less effect on the flocculation properties.

A further advantage of the invention is that it is usually possible to obtain flock size that is much greater than is obtainable using conventional, highly water-soluble, flocculants. Because, at the optimum dose, the floc size is much greater than is available conventionally this again means that the dose can be varied above or below the optimum whilst still obtaining improved results compared to those obtainable conventionally.

The invention is of particular value when the flocculated suspension is subjected to shear either as a preliminary to or during dewatering, or during some other process, and accordingly preferred processes of the invention include the application of shear to the flocculated suspension, often prior to or during dewatering of the suspension. Flocs formed with conventional linear flocculant polymers have low stability to shear and when they are sheared they break down into small fines that cannot easily be reflocculated into the flocs. For instance if conventional flocculated dispersions are sheared this results in the formation of a large proportion of fines that do not easily reflocculate within the dispersion and that cannot easily be separated from the liquid phase of the dispersion. Thus dewatering is poor. In the invention however it is possible to obtain flocs which are much more shear stable and, as mentioned, are larger. Upon applying shear these flocs may be broken down in size but they are broken down primarily to smaller, shear stable, flocs in preference to the unwanted fines obtained using conventional flocculants. Accordingly, even though the floc size is reduced, the dewatering and other properties of the flocculated dispersion are still satisfactory, and are much better than those obtainable with conventional flocculants.

One situation in which the shear stability of the flocs is very valuable is in dewatering that is performed under shear, and in particular centrifugal dewatering.

Another process where the shear stability of the flocs is valuable is when the flocs are to be maintained for a prolonged period in an agitated liquid medium, for instance in a chemical reaction vessel.

Another process where the shear stability of the flocs is very valuable is in the formation of paper and paper products such as board, since the processes of the invention permit improved dewatering of cellulosic and other suspensions. In conventional paper production it is generally necessary to minimise the amount of shear to which the flocs are subjected and so in practice the flocculant is added at the end of the pulp flow line, as late as possible before the drainage or other dewatering stage. In the invention however it is possible, and frequently desirable, to add the flocculant at an early stage in the pulp flow line so that the act of pumpng the flocculated dispersion along the flow line towards the drainage or other dewatering stage involves the application of shear to the flocculated pulp, and this shear converts the flocs to medium or small size flocs substantially free of undesirable fines. A preferred process of the invention therefore comprises flocculating a cellulosic suspension with the defined flocculant, and pumping the flocculated suspension along a flow line with sufficient shear to break down the flocs to smaller, shear stable, flocs and then dewatering the suspension by drainage or other suitable means. This process is of particular value when cationic starch is also added to the dispersion since the overall process then gives an exceedingly good combination of paper strength and retention and dewatering properties. For this process the flocculant polymer is preferably an anionic polyacrylamide. Synergism appears to exist.

The invention is of particular value in the centrifugal dewatering of municipal sewage that includes a significant industrial component, especially that includes variable amounts of iron.

The polymers are also of particular value for filtration or other dewatering of mineral slurries.

In filtration and other processes of dewatering sewage sludges or other suspensions the performance of the defined polymers can be equivalent to conventional polymers of much higher molecular weight.

The following are examples of the invention.

EXAMPLE 1

A gel copolymer A was formed of 20% sodium acrylate and 80% acrylamide by gel copolymerisation at 30% solids and pH 7.0.

The initiators were 200 ppm 4.4' azobis-4-cyanovaleric acid, 50 ppm ammonium persulphate and one ppm ferrous ion (as ferrous ammonium sulphate) and the polymerisation was initiated from 15 C.

The resultant gel was cut into 2.5 mm pieces and dried at 75 C. The dry polymer was then ground to a fine powder.

Its single point intrinsic viscosity measured in 1 M NaCl was 10.5 dlg$^{-1}$. The gel was dried and comminuted.

A copolymer B was formed of 20% sodium acrylate, 70% acrylamide and 10% of the acrylic acid ester of $C_{13}$-$C_{15}$ ethoxylate containing 20 ethoxy groups per molecule. The polymerisation conditions were the same as for the copolymer. Its single point intrinsic viscosity was 10.3 dlg$^{-1}$.

The copolymers A and B were compared for effectiveness as flocculants by dosing them at 0.5 to 10 ppm into a 2% aqueous slurry of china clay and observing the settlement rate over a 5 cm distance. The results are given in the following table in which the A tests are of copolymer A and the B tests are of copolymer B. Table 1

| Test | Dose ppm | Settlement M. Hr.$^{-1}$ | Clarity |
| --- | --- | --- | --- |
| 1A | 0.5 | 1.48 | f |
| 2A | 1.0 | 3.07 | g |
| 3A | 2.0 | 3.84 | g |
| 4A | 3.0 | 5.85 | ex |
| 5A | 5.0 | 22.19 | ex |
| 6A | 7.0 | 36.88 | ex |
| 7A | 10.0 | 50.70 | ex |
| 1B | 0.5 | 1.69 | f |
| 2B | 1.0 | 3.93 | f |
| 3B | 2.0 | 13.99 | g |
| 4B | 3.0 | 27.73 | vg |
| 5B | 5.0 | 44.00 | vg |
| 6B | 7.0 | 59.21 | vg |
| 7B | 10.0 | 64.98 | vg | f = fair
g = good
vg = very good
ex = excellent

The copolymer B thus gives increased settlement rate over the copolymer prepared under identical polymerisation conditions but without the pendant hydrophobic groups.

EXAMPLE 2

A novel copolymer C containing 33.5 parts by weight acrylamide, 62.5 parts methyl chloride quaternised dimethylaminoethyl acrylate (QDMAEA) and four parts N-substituted acrylamide—20 mole ethoxylate $C_{13}$-$C_{15}$ alkyl monomer was prepared by a 43% aqueous gel polymerisation, similar to Example 1. The monomer solution was initiated from 0° C. at pH 3.5 using 12 ppm potassium bromate 24 ppm sodium sulphite and 100 ppm 4,4' azobis-4-cyanovaleric acid.

The resultant gel was cut into 3.5 mm pieces, dried at 80° C. and ground to a fine powder. The polymer was completely water soluble at 1% and had a single point intrinsic viscosity of 8.9 dlg$^{-1}$.

A copolymer D of 37.5% acrylamide and 62.5% QDMAEA.MeCl was prepared under identical conditions. Its single point intrinsic viscosity was determined as 8.8 dlg$^{-1}$.

The two products were tested as sewage sludge dewatering aids on a digested primary activated sludge (from Rotherham Sewage Works) containing 0.5M sodium chloride. The results of the capillary suction times (CST) for the two poymers is shown in Table 2.

TABLE 2

| Product | C.S.T. (seconds) Dosage @ 80 gm$^{-3}$ | 60 gm$^{-3}$ | Performance Index |
|---|---|---|---|
| C | 34 | 57 | +28 |
| D | 121 | 147 | −116 |
| Comparative polymer | 54 | 71 | 0 |

The performance index is the mean of the values of $100-(CST_E/CSTex.100)$ for each dosage level, where CSTex is the CST of the product being tested and $CST_E$ is the CST of comparative polymer E, which is 37.5/62.5 acrylamide/QDMAEA IV=12.0 dlg$^{-1}$ It can be seen that the copolymer C is more effective than both the copolymer D prepared under the same conditions and a product of much higher molecular weight.

EXAMPLE 3

A novel copolymer F comprising by weight 55 parts of acrylamide, 40 parts of acryloxyethyl trimethyl ammonium chloride and 5 parts of a diester of itaconic acid formed from a 10 mole ethoxylate of stearyl alcohol was prepared by reverse phase polymerisation and dehydrated by azeotropic distillation to form a dispersion of polymer in oil containing 50% polymer. Conventional materials and process conditions were used, for instance using stabiliser as in BP No. 1482515 and process conditions as in EP No. 126528.

A Copolymer G was formed by the same process but without the itaconate.

The floc size was assessed visually. On a scale of 1 (largest) to 6(smallest) the copolymer G gave a floc size of 3 at doses of about 30 to 40 g/m$^3$ but the floc size decreased rapidly with lower or smaller doses. With the copolymer H the floc size was larger (i.e., a size of from 2 to 3) at doses of from about 140 to 250 g/m$^3$ and deteriorated only gradually with higher or lower doses.

This demonstrates that a better floc structure is obtainable from the copolymer of the invention, and the flocculation is much less sensitive to overdosing.

EXAMPLE 4

A copolymer of ammonium acrylate and the allyl ether of a 10 mole ethoxylate of stearyl alcohol (referred to below as C18-10EO-AE) was prepared by forming an aqueous monomer solution of 230 parts of acrylic acid, 10 parts of C18-10E)-AE, 0.6 parts of a 40% solution of penta-sodium diethylene triamine penta acetic acid, 0.01 parts of AZDN (azobisisobutyronitrile), 276 parts of water and 155 parts of 0.880 ammonia solution. This aqueous phase was homogenised into an oil phase comprising 12 parts of Span 80 (sorbitan mono-oleate), 68 parts of a 30% solution in SBP11 of a 2:1 molar copolymer of ceto-stearyl methacrylate:methacrylic acid, 204 parts of Pale Oil 60 and 233 parts of SBP11. The resulting monomer solution in oil dispersion was deoxygenated and polymerised using 3.36 parts of a 0.2% solution of tertiary butyl hydroperoxide dissolved in SBP11 and a 0.05% solution of sodium metabisulphite in water added continuously at a rate of 0.112 parts per minute. The resulting aqueous polymer gel dispersion in oil was then distilled under reduced pressure to remove water and SBP11 up to a final temperature of 95° C. at a pressure of 10 Torr. The resulting dehydrated concentrated polymer in oil dispersion was rendered water dispersible by mixing in 5 parts of a 5 mole ethoxylate of nonyl phenol per 100 parts of polymer in oil dispersion. This final dispersion dissolved in water rapidly to form polymer solutions which were used to flocculate a 2% wt/vol slurry of china clay in 0.1 molar sodium hydroxide solution. The flocculation performance was compared with that of a high molecular weight polyammonium acrylate prepared by gel polymerisation. The intrinsic viscosity of the copolymer was determined as 3.8 dl.gm$^{-1}$ and that of the standard homopolymer was 13.2 gl.gm$^{-1}$.

| Polymer Dose (mg. l$^{-1}$) | Settlement Rate (cm. min$^{-1}$) Copolymer | Standard Homopolymer |
|---|---|---|
| 3 | 13.3 | 6.3 |
| 4 | 16.6 | 16.6 |
| 6 | 29.1 | 28.3 |

It can be seen that the copolymer although of much lower intrinsic viscosity performs as a high molecular weight flocculant.

EXAMPLE 5

A copolymer of acrylamide (90 parts) and C18-10EO-AE (10 parts) was prepared by the method given in Example 4 and had IV 5.1. It was found to be an effective flocculant for china clay dispersed in water and was comparable to an acrylamide homopolymer of similar intrinsic viscosity (IV 5.8) in performance at low dose but was superior at higher doses.

| Polymer Dose (mg. l$^{-1}$) | Settlement Rate (cm. min$^{-1}$) Copolymer | Homopolymer |
|---|---|---|
| 5 | 17.3 | 19.7 |
| 7.5 | 19.9 | 23.1 |
| 10 | 26.1 | 24.8 |
| 12 | 33.0 | 26.0 |

EXAMPLE 6

A copolymer of β-acryloxyethyl trimethyl ammonium chloride (42 parts), acrylamide (53 parts) and C18-10EO-AE (5 parts) was prepared by the method given in Example 4. The intrinsic viscosity of the copolymer was 5.9 dl.gm$^{-1}$ and its flocculation performance on Rotherham sewage sludge was compared with a 42/58-β-acryloxyethyl trimethyl ammonium chloride/arylamide copolymer of intrinsic viscosity 12.4 dl.gm$^{-1}$ and found to be similar at the same polymer dose level, despite the large difference in IV.

EXAMPLE 7

Dimethylamino propyl methacrylamide may be dissolved in methanol and then quaternised by addition of stearyl chloride. The methanol may then be removed by evaporation and the quaternised monomer may then be dissolved in water with arylamide to form a monomer solution. This may then be subjected to gel polymerisation in conventional manner to form a high molecular weight, water soluble, flocculant in which the quaternising group provides the hydrophobe.

We claim:

1. A process of flocculating an aqueous suspension of organic or inorganic particles comprising adding an effective amount of a flocculant to cause flocculation in said aqueous suspension, said flocculant being a water-soluble substantially linear polymer having a single point intrinsic viscosity above 3 and that is a copolymer of (a) 1.0 to 90% by weight ethylenically unsaturated monomer including a group —$B_nA_mR$ where A is propoxy or butoxy, B is ethoxy, n is an integer of 2 to 100 and m is zero or an integer less than n, and R is a hydrophobic group of at least 8 carbon atoms and wherein the ethylenically unsaturated monomer is selected from an ester formed between an ethylenically unsaturated carboxylic acid and said group, an ethylenically unsaturated amide substituted on the amide nitrogen atom by said group and a (meth) allyl ether with said group, with (b) 99 to 10% by weight at least one water-soluble ethylenically unsaturated comonomer selected from the group consisting of acrylic acid, methacrylic acid, 2-acrylamido methyl propane sulphonic acid, acrylamide, dialkyl amino alkyl (meth) acrylate and dialkyl amino alkyl (meth) acrylamide, including acid and quaternary salts thereof.

2. A process according to claim 1 in which the amount of monomer (a) is at least 3%.

3. A process according to claim 1 or claim 2 in which the single point intrinsic viscosity is at least 7.

4. A process according to claim 1 in which the amount of monomer (a) is from 2 to 50% by weight and the amount of monomer (b) is 98 to 50% by weight.

5. A process according to claim 1 in which the polymer is cationic.

6. A process according to claim 1 in which the polymer is cationic and monomer (b) includes 10-90% by weight of total monomers, of cationic monomer selected from dialkylaminoalky (meth) acrylates and dialkylaminoalkyl (meth) acrylamides including acid addition and quaternary ammonium salts thereof.

7. A process according to claim 1 in which the polymer is formed from 1-90% by weight monomer (a), 0-80% by weight acrylamide and 10-99% by weight cationic monomer selected from dialkylaminoalky (meth) acrylates and dialkylaminoalkyl (meth) acrylamides, including acid addition and quaternary ammonium salts thereof.

8. A process of flocculating an aqueous suspension of organic or inorganic particles comprising adding an effective amount of a flocculant to cause flocculation in said aqueous suspension, said flocculant being a water-soluble substantially linear polymer having a single point intrinsic viscosity above 3 and that is a copolymer of (a) 1.0 to 90% by weight ethylenically unsaturated monomer including a group —$B_nA_R$ where A is propoxy or butoxy, B is ethoxy, n is an integer of 2 to 100 and m is zero or an integer less than n, and R is a hydrophobic group of at least 8 carbon atoms and wherein the ethylenically unsaturated monomer is selected from an ester formed between an ethylenically unsaturated carboxylic acid and said group, an ethylenically unsaturated amide substituted on the amide nitrogen atom by said group, and a (meth) allyl ether with said group, with (b) 99 to 10% by weight at least one water-soluble ethylenically unsaturated comonomer selected from the group consisting of acrylic acid, methacrylic acid, 2-acrylamido methyl propane sulphonic acid, acrylamide, dialkyl amino alkyl (meth) acrylate and dialkyl amino alkyl (meth) acrylamide, including acid and quaternary salts thereof, and separating said flocculated particles from the aqueous suspension.

9. A process of flocculating an aqueous suspension of organic or inorganic particles comprising adding an effective amount of a flocculant to cause flocculation in said aqueous suspension, said flocculant being a water-soluble substantially linear polymer having a single point intrinsic viscosity above 3 and that is a copolymer of (a) 1.0 to 90% by weight ethylenically unsaturated monomer having the formula $CH_2=CR'CH_2OB_nA_mR$ where R' is hydrogen or methyl, A is propoxy or butoxy, B is ethoxy, n is an integer of 5 to 100 and m is zero or an integer less than n, and R is a hydrophobic group of at least 8 carbon atoms with (b) 99 to 10% by weight of at least one water-soluble ethylenically unsaturated comonomer selected from the group consisting of acrylic acid, methacrylic acid, 2-acrylamido methyl propane sulphonic acid, acrylamide, dialkyl amino alkyl (meth) acrylamide, including acid and quaternary salts thereof, and separating said flocculated particles from the aqueous suspension.

* * * * *